United States Patent
Kechichian et al.

(10) Patent No.: US 9,800,734 B2
(45) Date of Patent: Oct. 24, 2017

(54) ECHO CANCELLATION

(71) Applicant: KONINKLIJKE PHILIPS N.V., Eindhoven (NL)

(72) Inventors: Patrick Kechichian, Eindhoven (NL); Cornelis Pieter Janse, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/036,963

(22) PCT Filed: Nov. 5, 2014

(86) PCT No.: PCT/EP2014/073806
§ 371 (c)(1),
(2) Date: May 16, 2016

(87) PCT Pub. No.: WO2015/086229
PCT Pub. Date: Jun. 18, 2015

(65) Prior Publication Data
US 2016/0309042 A1    Oct. 20, 2016

(30) Foreign Application Priority Data

Dec. 12, 2013   (EP) .................................... 13196964

(51) Int. Cl.
*H04M 9/08* (2006.01)
*G10K 11/175* (2006.01)

(52) U.S. Cl.
CPC ........... *H04M 9/085* (2013.01); *G10K 11/175* (2013.01)

(58) Field of Classification Search
CPC ..... H04M 9/082; H04M 9/085; G10K 11/175
See application file for complete search history.

(56) References Cited

U.S. PATENT DOCUMENTS 6,570,985 B1 *   5/2003   Romesburg ............. H04B 3/23
                                                     379/390.02
6,744,887 B1     6/2004   Berstein et al.
(Continued)

FOREIGN PATENT DOCUMENTS

| EP | 1584177 B1 | 11/2007 |
| EP | 2575375 A1 | 4/2013 |
| EP | 2632141 A1 | 8/2013 |

OTHER PUBLICATIONS

Hoshuyama et al, "An Acoustic Echo Supressor Based on a Frequency-Domain Model of Highly Nonlinear Residual Echo", ICASSP, 2006, p. V-269-V-272.
(Continued)

*Primary Examiner* — Sonia Gay

(57) ABSTRACT

An audio echo suppressor includes a first receiver for receiving a first audio signal for rendering by a loud-speaker and a second receiver for receiving a microphone signal. A linear echo-cancellation filter generates a first compensation signal from the first audio signal and a compensator generates a residual signal by compensating the microphone signal for the first compensation signal. A first adapter determines filter parameters for the linear echo-cancellation filter. An estimator generates distortion measures where each distortion measure is indicative of the contribution to the residual signal in a frequency interval outside a first frequency interval. The residual signal results from rendering of signal components of the first audio signal that are within the first frequency interval. An echo reducer performs echo suppression based on the distortion measures.

16 Claims, 6 Drawing Sheets

(56) References Cited

U.S. PATENT DOCUMENTS

| | | | |
|---|---|---|---|
| 2007/0071254 A1 | 3/2007 | Marton | |
| 2009/0214048 A1 | 8/2009 | Stokes, III et al. | |
| 2011/0093102 A1* | 4/2011 | Aichner | H04M 9/082 |
| | | | 700/94 |
| 2013/0217349 A1* | 8/2013 | Helsloot | H04M 1/035 |
| | | | 455/114.2 |
| 2013/0287216 A1* | 10/2013 | Eriksson | G10L 21/02 |
| | | | 381/59 |
| 2015/0003606 A1* | 1/2015 | Nemer | H04M 9/082 |
| | | | 379/406.01 |

OTHER PUBLICATIONS

Mossi, "Non-Linear Acoustic Echo Cancellationusing Online Loudspeaker Linearizaitn", IEEE Workshop on Appliation of Signal Processing to Audio and Acoustics, 2011, p. 97-100.

Seppanen et al, "Maximization of the Subjective Loudness of Speech With Constrained Amplitude", IEEE Workshop on Applications of Signal Processing to Audio and Acoustics, 1999, pp. 139-142.

Zorila et al, "Speech-In-Noise Intelligibility Improvement Based on Power Recovery and Dynamic Range Compression", 20th European Signal Processing Conference (EUSIPCO), 2012, pp. 2075-2079.

Bendersky et al, "Nonlinear Residual Acoustic Echo Suppression for High Levels of Harmonic Distortion", ICASSP, 2008, pp. 261-264.

Yemdji et al, "Efficient Low Delay Filtering for Residual Echo Suppression", 18th European Signal Processing Conference (EUSIPCO) 2010, pp. 16-20.

* cited by examiner

ECHO CANCELLATION

CROSS-REFERENCE TO PRIOR APPLICATION

This application is the U.S. National Phase application under 35 U.S.C. §371 of International Application No. PCT/EP2014/073806, filed on Nov. 5, 2014, which claims the benefit of European Patent Application No. 13196964.4, filed on Dec. 12, 2013. These applications are hereby incorporated by reference herein.

FIELD OF THE INVENTION

The invention relates to echo cancellation and in particular, but not exclusively, to cancellation for non-linear echoes from a loudspeaker to a microphone.

BACKGROUND OF THE INVENTION

Many audio applications use both an audio transducer, such as a loudspeaker, as well as a microphone in the same audio environment. For example, telephone or teleconferencing applications typically employ speakers and microphones in close proximity.

However, acoustic coupling between the loudspeaker and the microphone causes the microphone signal to include elements of the sound rendered from the loudspeaker which is often disadvantageous.

For example, for telephone and teleconference devices, the acoustic coupling between the device's loudspeaker and microphone causes a portion of the produced loudspeaker signal to be captured by the microphone and transmitted back to the far-end user resulting in a disturbance known as an acoustic echo. It is usually assumed that this echo path can be sufficiently modeled using a linear filter since the microphone picks up reflections of the loudspeaker signal with different delays and intensities, depending on the acoustic environment where the device is being used. Therefore, linear echo cancellers are widely used to reduce the acoustic echo.

In practice, however, and depending on the device, components in the acoustic echo path also include the audio amplifier and loudspeaker which often exhibit nonlinear characteristics. In particular, in many practical implementations, the loudspeaker exhibits significant non-linear distortion during operation. For example, in order to ensure compact and low cost implementation, loudspeakers of mobile phones are often driven at least partially in their non-linear domain. Therefore, purely linear echo cancellation tends to be suboptimal and tends to not be able to completely remove the acoustic echo.

EP2632141 A1 discloses such an echo suppressor that is a traditional linear echo suppressor that is not able to handle distorted echo components.

The primary causes of nonlinearities in loudspeakers are the non-uniform magnetic flux density and nonlinear suspension system. The latter mainly contributes to distortion at low frequencies, while the former is exacerbated by high-amplitude signals. In effect, large cone excursions, particularly those outside of the loudspeaker's linear operating range, result in nonlinear distortions. For audio amplifiers, high-amplitude signals can be clipped if they fall outside of the linear input range of the amplifier's input/output characteristic.

In more detail, the behavior of a loudspeaker system may be considered for different frequency ranges of an input signal. For frequencies above the resonance frequency, the loudspeaker can be characterized by its voice coil's resistance and inductance. Therefore, as the input power to the voice coil increases and the excursions become large enough for the coil to fall outside of the magnetic field, the driving force decreases, resulting in a form of compression or clipping effect.

For low frequencies, the loudspeaker is predominantly characterized by its moving system impedance which is proportional to the power of the magnetic flux. This means that as the voice coil moves outside of the magnetic field, this impedance decreases and therefore instead of clipping, the amplitude of the current in the voice coil actually increases before the loudspeaker's suspension system limits the excursion.

Proper modeling of the nonlinear behavior of loudspeakers remains a challenging topic in the field of acoustic echo cancellation. This is especially true for hands-free communication applications where low-cost audio components such as amplifiers and loudspeakers are used. These components are often driven into their nonlinear range of operation in order to achieve a high sound output level required for such applications. The resulting nonlinear distortion not only limits the performance of acoustic echo cancellers, which usually assume a linear impulse response between the loudspeaker and microphone, but also affects the perceived quality of the loudspeaker signal.

US 2009/214048 A1 discloses an adaptive NLMS-based echo suppression for harmonic distortion. However, due to the use of NLMS-based echo suppression the adaptation should only be carried out for high magnitude signals. Furthermore, an adaptive threshold should be used to predict which frequencies might produce harmonic distortions in order to enable adaptation.

Therefore, systems for managing nonlinear acoustic echo play a significant role in improving the audio quality for two-way communication systems.

In the prior art, three main classes of systems exist for cancelling or suppressing nonlinear acoustic echoes:
1. Nonlinear acoustic echo cancellation.
2. Loudspeaker linearization for linear acoustic echo cancellation.
3. Nonlinear acoustic echo suppression.

In the first type of system, the acoustic echo path nonlinearity is modeled by the acoustic echo canceller. For example, saturation of the audio amplifier can be modeled using a clipping function with a clipping level that matches that of the audio amplifier. If this clipping function is applied to the digital loudspeaker signal, then a standard linear acoustic echo canceller can be used to model the linear acoustic path between the loudspeaker and microphone. As mentioned previously, the loudspeaker is also a source of nonlinearities. Unlike a clipping function which is memoryless, loudspeaker nonlinearities usually contain some form of memory, and are most commonly modeled by a Volterra series expansion which is computationally quite expensive. While low-cost versions of Volterra based algorithms exist, such as the power series expansion, these often still require signal orthogonalization methods which can still be computationally intensive.

A major drawback of the first type of system is that they are required to closely match the model to that of the underlying physical system. This typically cannot be achieved with a high degree of accuracy. Furthermore, they tend to be computationally very intensive.

The second type of system applies a non-linear function to the loudspeaker signal so that the concatenation of this function with that of the loudspeaker's response approximates a linear function, and thus the loudspeaker signal captured by the device's microphone is approximately a linear function of the loudspeaker signal. Accordingly, standard linear adaptive filters can be used to model this linear function and perform acoustic echo cancellation.

A drawback of such an approach is that it can only approximately linearize the loudspeaker's output signal and the performance usually degrades when amplifier saturation also occurs since such a transformation is not easy to linearize. Furthermore, the introduced non-linear function may be difficult to estimate and thus the cancellation may be suboptimal. Furthermore, it may directly affect the sound quality of the signal generated by the loudspeaker.

The third type of system is often used as a post-processing step to acoustic echo cancellation, where residual nonlinear acoustic echoes which could not be suppressed in the echo cancellation stage are suppressed. Usually this suppression is performed in the spectral amplitude domain using a spectral model of echo nonlinearity.

The main drawback of this approach is that due to over-suppression and lack of echo phase information in the spectral amplitude-domain, near-end audio (and specifically speech) originating from the local environment can be severely attenuated which may result in making e.g. full duplex communication with the far-end party difficult.

In general, prior art approaches to echo-cancellation, and especially for cancellation of non-linear effects, tend to be complex, result in sub-optimal performance and/or high computational resource usage.

Hence, an improved approach would be advantageous and in particular an approach allowing increased flexibility, reduced complexity, facilitated implementation, reduced resource usage and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio echo suppressor according to claim 1.

The invention may provide an improved echo suppression/cancellation in many embodiments. In particular, it may provide improved suppression of echo components resulting from non-linear effects, such as power amplifier or loudspeaker non-linearities. The echo suppression may in some embodiments be achieved by reducing or preventing non-linear effects of the rendering and/or by compensation of non-linearities in the residual signal/captured microphone signal.

In particular, an improved adaptation of echo suppression to the specific non-linear effects experienced may be achieved. In particular, the distortion measure for the first frequency interval provides a very suitable measure for determining the non-linear echo resulting from the specific signal components in the first frequency interval thereby allowing the system to address these effects specifically.

The system may be arranged to generate distortion measures for a plurality of frequency intervals (specifically using the same approach as for the first frequency interval). The echo suppression may be performed in response to all distortion measures. Specifically, the echo suppression may be performed in subbands corresponding to the frequency intervals for the distortion measures. The echo suppression in each subband may in some embodiments be adapted in response to the distortion measure for the corresponding frequency interval, and indeed in many embodiments the echo suppression of each subband/frequency interval may be dependent on the distortion measure of only that subband/frequency interval.

The distortion measures used may provide a particularly advantageous performance, especially for dealing with non-linear effects. Indeed, it may provide for accurate evaluation of non-linear effects without requiring detailed non-linear models to be generated and adapted. The approach may in many embodiments provide improved echo suppression while maintaining low complexity.

The approach may allow a dynamic reduction of resulting echoes in the residual signal fed to the far end with the distortion measures continuously being updated, and with the echo suppression accordingly continuously being adapted to the specific conditions.

The compensator may specifically be arranged to generate the residual signal by subtracting the first compensation signal from the microphone signal.

The echo reducer may specifically be arranged to perform echo suppression of non-linear echoes of the first audio signal.

In accordance with an optional feature of the invention, the first estimator comprises: a first subband generator for generating a first subband signal for the first frequency interval from the first audio signal; a second subband generator for generating a plurality of residual subband signals from the residual signal; a comparator for determining a similarity measure for at least some residual subband signals not belonging to the first frequency interval, the similarity measure for a residual subband signal being indicative of a similarity of the residual subband signal and the first subband signal; and a second estimator for determining the distortion measure for the first frequency interval from the similarity values.

The approach may allow a low complexity implementation and/or may allow improved adaptation of the echo suppression. In particular, a distortion measure providing a good indication of the non-linearity effect for a given frequency interval may be determined and used to adapt the echo suppression thereby resulting in improved echo suppression. The approach may be particularly advantageous for echo suppression performed by modifying the first audio signal, i.e. it may be particularly advantageous for pre-processing echo suppression/cancellation.

In some embodiments, the at least some residual subband signals not belonging to the first frequency interval comprises all residual subband signals not belonging to the first frequency interval.

The subbands may be generated from the first audio signal and the residual signal respectively by applying a frequency transform to the first audio signal and the residual signal. The frequency transform may generate subband values that in some embodiments may be used directly as the subband signals. In some embodiments, the generated transformation values may be further processed to generate the subbands. For example, a subband signal corresponding to a plurality of transform subbands may be generated by averaging the values of the transform subbands.

Each subband signal may comprise a time representation of a subband filtered version of the corresponding signal down-converted to have a center frequency (of the subband) of 0 Hz. For example, an FFT may be applied to blocks of the residual signal and the residual subband signals may correspond to the time signal for each bin formed by values of consecutive blocks. In some embodiments, a plurality of bins may be combined to generate one or more of the subband signals.

The approach of generating a distortion measure may be repeated for different subbands of the first audio signal. For example, a frequency transform may be applied to the first audio signal to generate a plurality of subband signals. For each subband signal, a distortion measure may be determined as a combination of similarity values that have been determined for the pairings of the specific subband signal and the residual subband signals that are not part of the frequency interval of the specific subband signal.

In accordance with an optional feature of the invention, the comparator is arranged to generate the similarity measure for a first residual subband signal in response to a similarity of signal variations of the first subband signal and signal variations of the first residual subband signal.

The signal variations may be variations with time. The approach may specifically seek to identify correspondence between events in the first subband signal and events in the first residual subband signal. The larger the correspondence, the larger the similarity value. The approach may provide an improved indication of non-linearities arising from signal components in the first frequency interval.

In accordance with an optional feature of the invention, the comparator is arranged to generate the similarity measure for a first residual subband signal in response to a cross correlation of the first subband signal and the first residual subband signal.

This may provide a particularly efficient and/or low complexity determination of the distortion measures.

The comparator may specifically be arranged to generate the similarity measure for a first residual subband signal in response to a maximum cross correlation of the first subband signal and the first residual subband signal. The maximum cross correlation may correspond to the cross correlation value for a time offset resulting in the largest cross correlation value.

In some embodiments, the first estimator is arranged to generate the residual subband signals and the first subband signal as envelope signals.

This may provide improved performance and/or reduced complexity in many embodiments. The envelope signals may specifically correspond to (possibly complex) values of subband samples generated by a frequency transform, such as an FFT.

In accordance with an optional feature of the invention, the first estimator is arranged to generate distortion measures for a plurality of frequency intervals, and the echo reducer is arranged to separately adjust parameters of the echo suppression for each frequency interval of the plurality of frequency intervals in response to the distortion measure for the frequency interval.

This may provide effective yet low complexity echo suppression. In particular, it may allow low complexity by allowing a separate and individual processing of each frequency band. The approach may in many scenarios allow the impact on the audio quality to be reduced as only problematic frequency bands need to be affected by the echo suppression.

Thus, in many embodiments the echo suppression for each of the plurality of frequency intervals may be in response to the distortion measure for only that frequency interval.

In accordance with an optional feature of the invention, the second estimator is arranged to generate the distortion measure by combining similarity values for a plurality of the at least some residual subband signals.

This may provide an advantageous distortion measure. The combination may specifically comprise a (possibly weighted) summation or averaging.

In accordance with an optional feature of the invention, the second estimator is arranged to normalize the distortion measure with respect to a power estimate for the contributions to the microphone signal from signal components of the first audio signal within the first frequency interval.

This may provide improved performance in many embodiments. In particular, it may allow a normalized distribution of the distortion measure in the interval of [0;1].

In accordance with an optional feature of the invention, the second estimator is arranged to generate the power estimate in response to a linear echo power estimate for the first frequency interval, the linear echo power estimate being generated in response to the set of filter parameters.

This may provide improved performance in many embodiments.

In accordance with an optional feature of the invention, the comparator is arranged to select the at least some residual subband signals in response to a harmonic relationship between a frequency of the first frequency interval and a subband frequency of the residual subband signals.

This may provide improved performance in many embodiments. Specifically, it may allow a distortion measure which more accurately reflects a total harmonic distortion. This may reduce noise in estimating the non-linear effects in many embodiments where the non-linear effects are e.g. known to predominantly cause harmonics. Alternatively or additionally, it may reduce complexity and/or computational resource demand in many embodiments.

In accordance with an optional feature of the invention, the first estimator comprises: a first subband generator for generating a first residual subband signal for the first frequency interval from the residual signal; a second subband generator for generating a plurality of first audio subband signals from the first audio signal; a comparator for determining a similarity measure for at least some first audio subband signals not belonging to the first frequency interval, the similarity measure for a first audio subband signal being indicative of a similarity of the first audio subband signal and the first residual subband signal; and a second estimator for determining the distortion measure for the first frequency interval from the similarity values.

The approach may allow a low complexity implementation and/or may allow improved adaptation of the echo suppression. In particular, a distortion measure providing a good indication of the non-linearity effect for a given frequency interval may be determined and used to adapt the echo suppression thereby resulting in improved echo suppression. The approach may be particularly advantageous for echo suppression performed by modifying the residual signal, i.e. it may be particularly advantageous for post-processing echo suppression/cancellation.

In some embodiments, the at least some first audio subband signals not belonging to the first frequency interval comprises all first audio subband signals not belonging to the first frequency interval.

The approach may allow a low complexity implementation and/or may allow improved adaptation of the echo suppression. In particular, a distortion measure providing a good indication of the non-linearity effect for a given frequency interval may be determined and used to adapt the echo suppression thereby resulting in improved echo suppression.

In some embodiments, the at least some residual subband signals not belonging to the first frequency interval comprises all residual subband signals not belonging to the first frequency interval.

The subbands may be generated from the first audio signal and the residual signal respectively by applying a frequency transform to the first audio signal and the residual signal. The frequency transform may generate subband values that in some embodiments may be used directly as the subband signals. In some embodiments, the generated transformation values may be further processed to generate the subbands. For example, a subband signal corresponding to a plurality of transform subbands may be generated by averaging the values of the transform subbands.

Each subband signal may comprise a time representation of a subband filtered version of the corresponding signal down-converted to have a center frequency (of the subband) of 0 Hz. For example, an FFT may be applied to blocks of the residual signal and the residual subband signals may correspond to the time signal for each bin formed by values of consecutive blocks. In some embodiments, a plurality of bins may be combined to generate one or more of the subband signals.

The approach of generating a distortion measure may be repeated for different subbands of the residual signal. For example, a frequency transform may be applied to the residual signal to generate a plurality of residual subband signals. For each subband signal, a distortion measure may be determined as a combination of similarity values that have been determined for the pairings of the specific residual subband signal and the first audio subband signals that are not part of the frequency interval of the specific residual subband signal.

In accordance with an optional feature of the invention, the second estimator is arranged to generate the distortion measure for the first residual subband signal based on a combination of similarity values for a plurality of the at least some first audio subband signals.

This may provide an advantageous distortion measure. The combination may specifically comprise a (possibly weighted) summation or averaging.

In accordance with an optional feature of the invention, the echo reducer is arranged to modify the first audio signal in response to the set of distortion measures prior to rendering by the loudspeaker.

This may provide a particularly efficient echo suppression in many embodiments and in many scenarios. Specifically, echo suppression in the form of pre-processing may be performed to mitigate the non-linear effects by reducing signal components causing non-linear echoes. Thus, it may reduce or even prevent the non-linear echoes arising.

In some embodiments, the first subband signal may be generated from the first audio signal prior to modification. In other embodiments, the first subband signal may be generated from the first audio signal following modification. The adaptation of the pre-processing may in the latter case be implemented as a feedback loop where the modification is adapted in response to the distortion measures and the distortion measures are generated based on the first audio signal following the pre-processing/modification.

In some embodiments, the first compensation signal is generated from the first audio signal prior to modification. In some embodiments, the first compensation signal is generated from the first audio signal following the modification.

The echo reducer may be arranged to modify the first audio signal to reduce the distortion measures. Specifically, in some embodiments, the modifying for a frequency interval is such that the distortion measure for that frequency interval is reduced to a target level. The target level may be a non-zero value.

In accordance with an optional feature of the invention, the echo reducer is arranged to set a gain or a clipping level for the first audio signal in the first frequency interval in response to the distortion measure for the first frequency interval.

This may provide a particularly efficient and/or low complexity implementation and operation. The variable gain or clipping may be applied to the first audio signal before or after this being fed to the linear echo-cancellation filter. The variable gain or clipping may be performed applied to the first audio signal before or after the first subband signal is generated from the first audio signal.

In accordance with an optional feature of the invention, the echo reducer is arranged to modify the residual signal in response to the set of distortion measures.

This may provide a particularly efficient echo suppression in many embodiments and in many scenarios. Specifically, echo suppression in the form of post-processing may be performed to mitigate the non-linear effects by reducing signal components predominantly corresponding to non-linear echoes.

The echo reducer may specifically modify the signal of subbands for which a high measure value is estimated.

In accordance with an optional feature of the invention, the echo reducer is arranged to set a gain or a clipping level for the residual signal in the first frequency interval in response to the distortion measure for the first frequency interval.

This may provide a particularly efficient and/or low complexity implementation and operation.

In some embodiments, the echo reducer is arranged to modify the first audio signal in response to the set of distortion measures prior to rendering by the loudspeaker and to modify the residual signal in response to the set of distortion measures.

In some embodiments, the comparator may determine a similarity measure for a first residual subband signal in a first frequency interval and at least some subband signals of the first audio signal not belonging to the first frequency interval, the similarity measure for the first residual subband signal and a subband signal of the first audio signal being indicative of a similarity of the first residual subband signal and the subband signal of the first audio signal. A distortion measure for the first residual subband signal may be determined by combining similarity measures for the first residual subband signal and a plurality of subband signals of the first audio signal outside the first frequency interval.

The distortion measure may be indicative of the total amount of non-linear echo distortion in the individual residual subbands.

This may provide a particularly efficient operation and performance. In particular, efficient post-processing based on the estimated non-linear distortion in each residual subband signals may be performed.

Performing both pre- and post-processing may be advantageous. Specifically, the pre-processing and post-processing based on distortion measures for individual frequency bands provide a highly efficient echo suppression with a synergistic effect between the two approaches. Specifically, the combined echo suppression may optimize the quality trade-offs.

Specifically, conventional pre-processing approaches tend to be inefficient in mitigating linear echo effects and to result in degradations to the rendered audio due to the processing.

Similarly, conventional post-processing tends to be incapable of removing all non-linear effects and tends to introduce artefacts.

However, introducing both pre- and post-processing based on the distortion measures for individual frequency bands allows the system to adapt to a balance between the pre- and post-processing where the pre-processing can reduce the non-linear distortion to levels that can be reasonably handled by the post-processing without the pre-processing unacceptably degrading the rendered audio and without the post-processing unacceptably introducing artefacts. Thus, the approach may control the pre- and post-processing such that both operate within reasonable parameters and without requiring the individual process to work at extremes.

According to an aspect of the invention there is provided a method of audio echo suppression according to claim 15.

According to an aspect of the invention there is provided a computer program product comprising computer program code means adapted to perform all the steps of the above method when said program is run on a computer.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
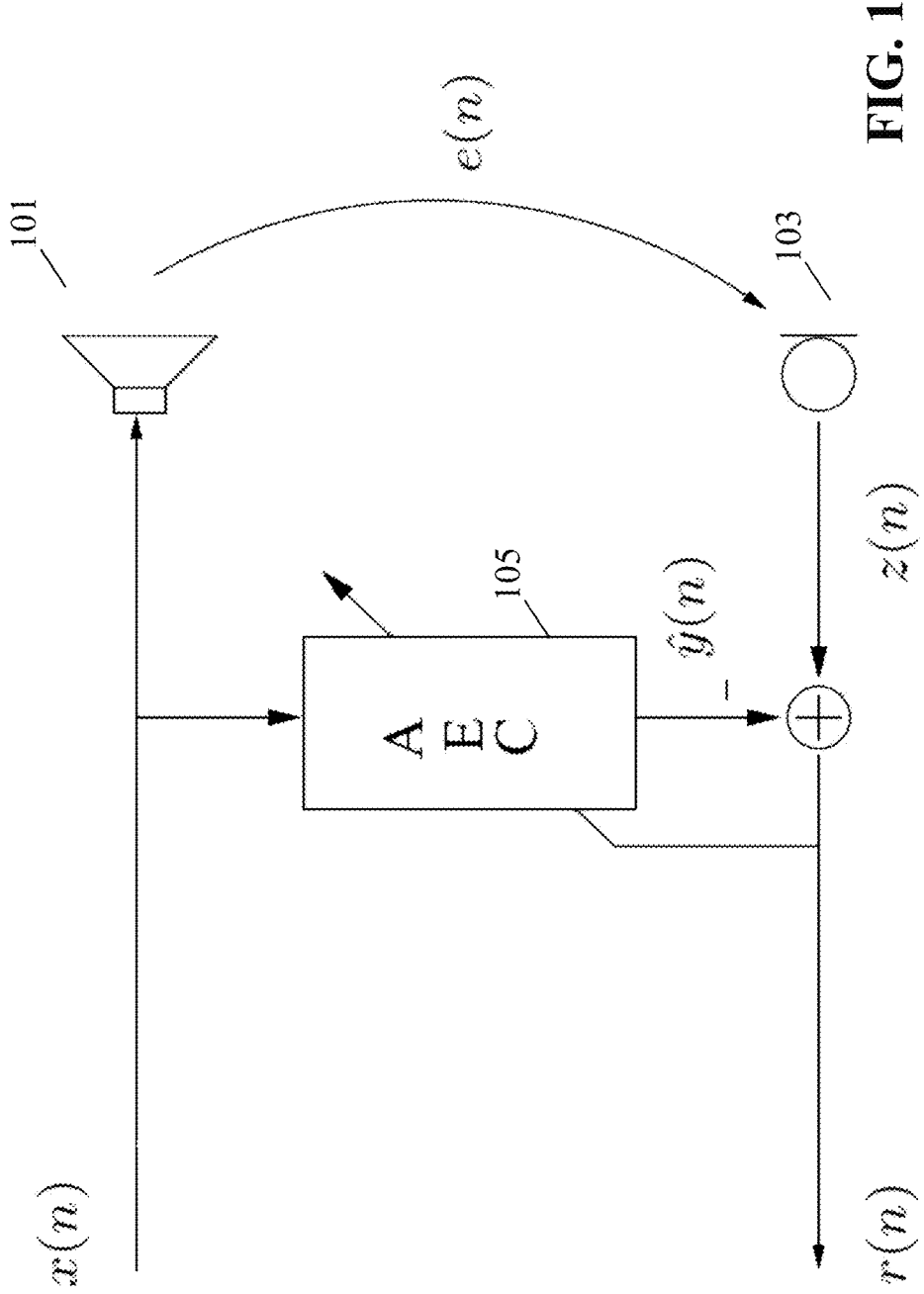
FIG. 1 illustrates elements of a linear echo cancelling system.

FIG. 1 illustrates the principle of a conventional linear echo cancelling system. The echo cancelling system may specifically be used in a communication system and is intended to cancel the echo perceived by a far end resulting from the audio signal from the far end being partially returned together with the audio from the near end.

The echo canceller receives an input signal x(n) which is fed to a loudspeaker 101 and rendered therefrom. The input signal x(n) is received from the far end and may for example contain speech or other audio sources.

A microphone 103 generates a microphone signal by capturing audio in the environment. The audio comprises e.g. a local speaker or other audio sources. In addition, due to the acoustic coupling/path between the loudspeaker 101 and the microphone 103, the microphone signal comprises part of the audio rendered from the loudspeaker 101, represented by e(n). If the captured signal is returned to the far end without further processing, the transmitted signal will comprise not only the near end audio but also a version of the input signal x(n), i.e. a delayed version of the audio at the far end. This will be perceived as an echo.

Therefore, in the echo canceller, an adaptive linear filter 105 receives the input signal x(n) and generates a prediction y(n) of the echo in the microphone signal z(n). The prediction y(n) is subtracted from the microphone signal z(n) thereby generating a residual signal r(n) which is sent to the far end.

The prediction filter, i.e. the adaptive linear filter 105, is adapted depending on the residual signal r(n), and may specifically be adapted to minimize the energy of the residual signal r(n). It will be appreciated that many different algorithms and approaches are known for adapting the prediction filter/adaptive linear filter 105.

Accordingly, a residual signal r(n) is generated in which the acoustic echo may be substantially reduced.

However, the echo canceller of FIG. 1 is inherently aimed at reducing linear echoes (i.e. echoes resulting from linear effects/processes). However, as many parts of the coupling of the input signal x(n) to the microphone signal z(n) are of a non-linear nature (e.g. power amplifier clipping, loudspeaker non-linearities), the linear echo cancellation is only able to address part of the introduced echo.

Figure 2:
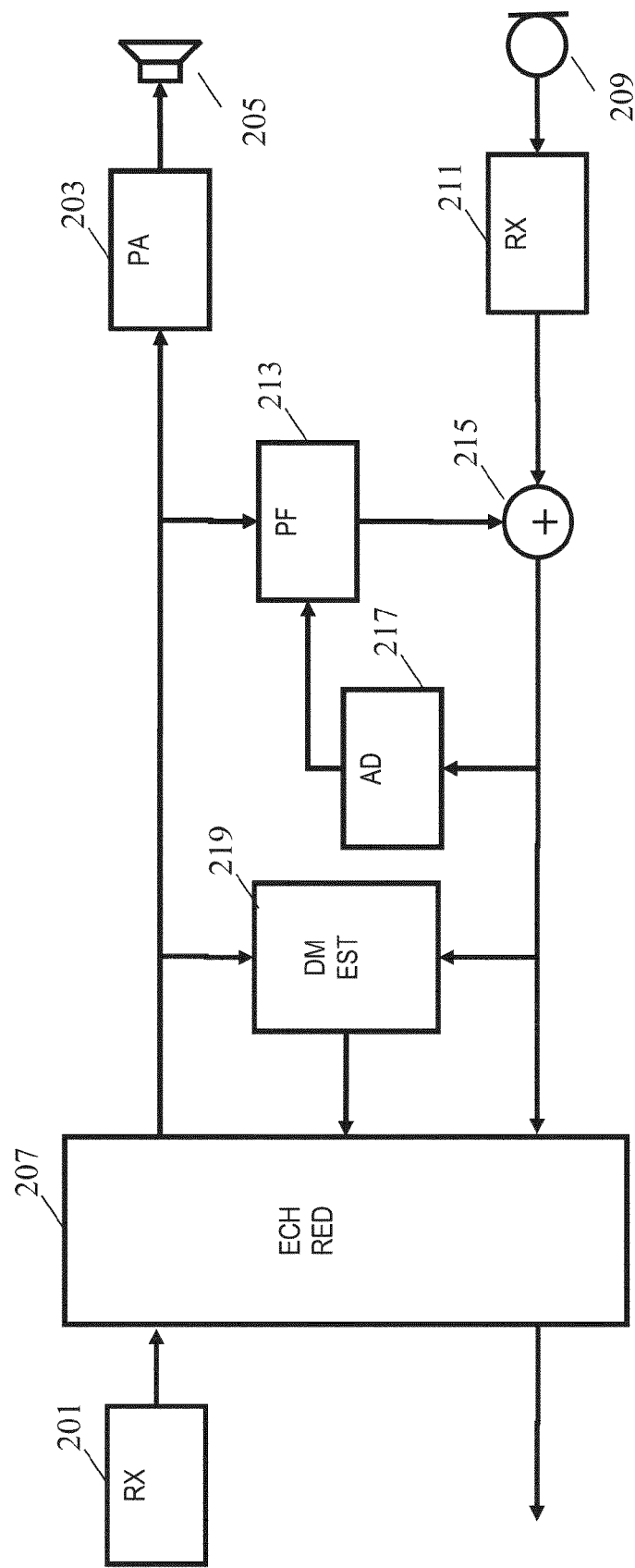
FIG. 2 illustrates some elements of an exemplary echo suppressor in accordance with some embodiments of the invention.

FIG. 2 illustrates some elements of an echo suppressor in accordance with some embodiments of the invention. The echo suppressor may provide improved echo suppression relative to the system of FIG. 1, and may specifically in many embodiments and scenarios provide improved suppression of non-linear echo components (i.e. echoes resulting from non-linear effects or processes).

The echo suppressor comprises a first receiver 201 which receives a first audio signal (corresponding to the input signal x(n) of FIG. 1) which is to be rendered. The first audio signal is received from a far end and may for example comprise speech for rendering to a user at the near end.

The first audio signal is fed to a power amplifier 203 which is coupled to a loudspeaker 205. In FIG. 2, the first audio signal is fed to the power amplifier 203 via an echo reducer 207.

As will be explained later, in some embodiments, pre-processing of the first audio signal may be performed prior to rendering in order to mitigate non-linear echo effects. In other embodiments, the first audio signal may be fed directly and unmodified to the power amplifier 203 for rendering.

The system furthermore comprises a microphone 209 which captures audio of the environment. The microphone 209 is coupled to a second receiver 211 which receives the signal from the microphone and outputs a microphone signal. The second receiver may comprise filter circuits, analog-to-digital conversion, amplification functionality etc.

The resulting microphone signal thus comprises the audio sources of the environment, such as a near end speaker. In addition, the microphone signal may comprise signal components corresponding to the audio rendered by the loudspeaker 205. In many applications, there is an acoustic path from the loudspeaker 205 to the microphone 209, i.e. the microphone 209 can "hear" the loudspeaker 205. The acoustic path may be directly via the air in the environment or may for example be via walls of a cabinet holding both the microphone 209 and the loudspeaker 205. As a consequence of the acoustic path, echoes of the rendered signal from the far end will be present in the microphone signal.

The echoes may be linear echoes resulting from a linear transfer function of the acoustic path. However, in addition, non-linear echoes may be introduced, e.g. due to the acoustic path having non-linear components, or due to non-linear effects in the power amplifier 203 or the loudspeaker 205.

In order to address the introduced effects, the echo reducer further comprises a linear echo-cancellation filter 213 which generates a first compensation signal from the first audio signal. The linear echo-cancellation filter 213 seeks to predict the acoustic path from the input of the power amplifier 203 to the output of the second receiver 211 (i.e. the microphone signal), i.e. the linear echo-cancellation filter 213 seeks to predict the echo that will result from the first audio signal.

The linear echo-cancellation filter 213 and the second receiver 211 are coupled to a compensator 215 which generates a residual signal by compensating the microphone signal for the first compensation signal. In many embodiments, the compensator 215 may simply subtract the first compensation signal from the microphone signal.

The system furthermore comprises a first adapter 217 which is coupled to the compensator 215 and the linear echo-cancellation filter 213. The first adapter 217 receives the residual signal and in response, it generates filter parameters for the linear echo-cancellation filter 213.

Thus, the adaptation of the linear echo-cancellation filter 213 may be based on a feedback loop where the parameters of the filter are adjusted to reduce a measure derived from the residual signal, e.g. the energy of the residual signal may be sought to be minimized.

It will be appreciated that any suitable adaptation approach may be used and that the skilled person will be aware of many different possible algorithms. For example, a minimum least squares error (MLSE) algorithm may be applied.

The residual signal is in the example fed to the echo reducer 207 which may perform an echo suppression on the signal before it is transmitted to the far end. In other embodiments, the residual signal may directly be transmitted to the far end.

Thus, FIG. 2 illustrates an example wherein the echo reducer 207 may perform echo suppression by processing both the first audio signal and the residual signal, i.e. both pre-processing and post-processing is performed. Indeed, as will be described later, such an approach may be particularly advantageous and provide improved echo suppression. However, in some embodiments, the echo suppression may be performed only on the first audio signal or on the residual signal, i.e. the echo suppression may be only a post-processing of the residual signal or a pre-processing of the first audio signal.

In the system of FIG. 2, the linear echo-cancellation filter 213 and the compensation by the compensator 215 seeks to remove the linear echoes. Typically, this can be achieved with relatively high efficiency. However, this compensation does not reduce or address non-linear echoes. Instead, the echo reducer 207 seeks to reduce or remove such non-linear echoes from the signal being sent to the far end.

The echo reducer 207 is specifically arranged to perform echo suppression in individual frequency intervals. Specifically, for each frequency interval of the first audio signal, a distortion measure is generated which is indicative of a degree of non-linear distortion which is caused by the rendering of this frequency interval of the first audio signal.

Specifically, for a first frequency interval, a first distortion measure is generated which is considered to be an estimate of the amount of non-linear distortion which is caused by/results from the signal components of the first audio signal in the first frequency interval.

Based on the distortion measure, the echo reducer 207 may then proceed to process the first audio signal. Thus, the signal components of the first audio signal in the first frequency interval are modified based on the first distortion measure.

As an example, the gain of the first frequency interval may be set dependent on the first distortion measure. If the first distortion measure indicates that there is a high degree of non-linear distortion caused by the first frequency interval of the first audio signal, the gain for this specific frequency interval may be reduced accordingly.

Accordingly, the system of FIG. 2 comprises a first estimator 219 which is arranged to generate a set of distortion measures. Each distortion measure is linked to a frequency interval. In some embodiments, the set may only contain a single distortion measure, but in most embodiments, a plurality of distortion measures are included. Specifically, a frequency range (e.g. corresponding to the audio range) may be divided into a plurality of frequency intervals with a distortion measure being generated for each of these frequency intervals.

The first estimator 219 receives the first audio signal and the residual signal and based on these, it may generate the set of distortion measures that are then fed to the echo reducer 207.

The first estimator 219 is specifically arranged to generate each distortion measure as indicative of a contribution to the residual signal in at least one frequency interval outside a first frequency interval resulting from signal components of the first audio signal within the first frequency interval.

Thus, for a given first frequency interval, the first estimator 219 estimates the signal components in the residual signal that do not fall in the first frequency interval but which nevertheless result from the rendering of signal components within the first frequency interval, i.e. from signal components of the first audio signal that are within the first frequency interval.

Thus, a distortion measure is calculated to reflect signal components that are likely to result from a process that not only changes an amplitude and phase, but also the frequency of signal components. Thus, the first estimator 219 is arranged to discriminate between linear effects and non-linear effects by differentiating between echo signal components having changed frequency and signal components that have not. Accordingly, distortion measures that provide a good indication of the non-linear echoes resulting from each frequency interval of the first audio signal are generated and used to adapt the echo suppression by the echo reducer 207. Accordingly, the echo reducer 207 may use this information to specifically target the non-linear effects.

For example, rather than considering where in the frequency range the echo components are present and specifically addressing these frequency intervals, the system of FIG. 2 is capable of determining which frequency intervals of the first audio signal give rise to the echo components. Thus, the approach may allow the originating signal components rather than the resulting signal components to be used to control the echo suppression by the echo reducer 207.

It will be appreciated that the specific approach for suppressing the linear echoes based on the information of the originating frequency intervals as provided by the distortion measures may be different in different embodiments. Indeed, the specific information provided by the distortion measures may allow improved suppression of especially non-linear echoes for many different approaches and algorithms (of which some will be described later).

Figure 3:
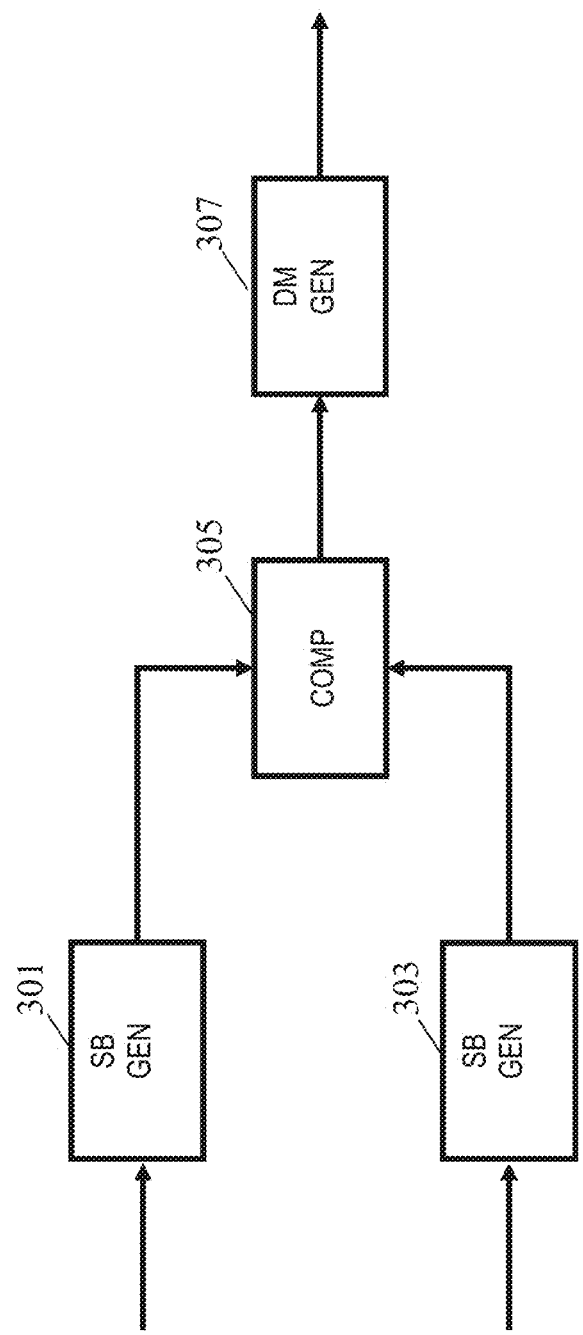
FIG. 3 illustrates some elements of an exemplary distortion measure processor in accordance with some embodiments of the invention.

FIG. 3 illustrates an example of elements of an exemplary implementation of the first estimator 219.

In the specific example, the first estimator 219 comprises a first subband generator 301 which receives the first audio signal and converts it into a number of subband signals. Specifically, a first subband signal is generated to correspond to the signal components of the first audio signal in the first frequency interval. Such a single subband signal may be generated by a filtering of the first audio signal.

Although the approach in some embodiments may consider only a single frequency interval, the system may in most embodiments consider a plurality of frequency intervals. Thus, in most embodiments, the first subband generator 301 generates a plurality of subband signals. The subbands signals may specifically be generated by performing a time to frequency domain transform, such as an FFT or a QMF transform.

The first estimator 219 furthermore comprises a second subband generator 303 which receives the residual signal and proceeds to generate a plurality of residual subband signals. The second subband generator 303 may for example perform a time to frequency domain transform, such as an FFT transform, to generate the residual subband signals. As another example, a QMF filter bank may be used.

The first subband generator 301 and the second subband generator 303 are coupled to a comparator 305. The comparator 305 proceeds to generate a similarity measure for each pairing of a subband of the first audio signal and a residual subband signal where the subbands correspond to different frequencies.

Specifically, for the first frequency interval, a similarity measure is generated for each of the residual subband signals that do not belong to the first frequency interval. The similarity measure for each pairing is generated to be indicative of the similarity of the first subband signal and the residual subband signal being considered.

The similarity value for any pair of subband signals may specifically be generated based on a comparison of the signal variations of the subband signal and the residual subband signal of the pair. Thus, if the pair of the first subband signal and a first residual subband signal is considered, the comparator 305 may proceed to evaluate how closely the variations (with time) of the first subband signal matches the variations (with time) of the first residual subband signal. The more the signal exhibits corresponding variations, the higher the similarity measure for that subband is In some embodiments, the comparator 305 may for example detect specific events in one subband signal and search for corresponding events in the other subband signal. For example, if the first subband signal exhibits an abrupt step in amplitude, this may be detected by the comparator 305. The comparator 305 may then proceed to scan through the first residual subband signal to see if a corresponding step is present in this signal. If not, it may be considered that the two subband signals are not similar, and the similarity value may be set, e.g. to zero. If a corresponding step change is detected, the comparator 305 may set the similarity value to correspond to the relative magnitude of the step in the first residual subband signal.

However, although determining the similarity value based on specific events may provide efficient performance in many embodiments, it may in many embodiments be advantageous to perform a comparison considering the subband signals as a whole (in a given time interval).

Specifically, in many embodiments, the comparator 305 may generate the similarity value for a given pairing of subbands in response to a cross correlation between the subband signals, and specifically in response to the maximum value of the cross correlation for different time offsets between the subband signals.

Specifically, for the first subband signal and a first residual subband signal, the comparator 305 may calculate the cross correlation for a range of different time offsets between the subband signals. The highest value of the cross correlation may be identified and used to determine the similarity measure. In particular, the maximum cross correlation may directly be used as the similarity measure (or may e.g. be normalized).

In another embodiment, instead of using the first subband signal and a first residual subband signal, the comparator 205 may calculate the cross correlation between the autocorrelation functions of the first subband signal and a first residual subband signal. This eliminates the need to check the cross correlation value for a range of different time offsets.

In many embodiments, the evaluation may be based on envelope signals, i.e. on the (possibly complex) amplitude of the signal components in the given frequency interval. As an example, the generated values FFT bin values may be used directly or may be used without consideration of the phase. As a specific example, the correlation based on envelope signals may be determined by generating time representations of the envelope signals as the time sequence of the FFT bin values that are generated by consecutive FFT blocks. These time sequences may then be subjected to a cross correlation calculation. Thus, the more the variations with time of the FFT bin value for the first audio signal in the first frequency interval matches variations with time of the FFT bin value for the considered residual subband signal, the higher is the similarity value.

The comparator 305 thus proceeds to generate similarity values for all pairs of subband signals for the first audio signal and the residual signal that do not correspond to the same frequency bands. Thus, for a given frequency interval, say the first frequency interval, similarity values are generated indicating how much subband signals at other frequencies are correlated with the subband signal of the first audio signal in the first frequency interval. Thus, for a given frequency interval, similarity values are generated that indicate how likely it is that signal components in other frequency intervals result from the rendering of the first audio signal in the given frequency interval, i.e. similarity values are generated which reflect whether signal components are generated in other frequency bands.

The comparator 305 is coupled to a second estimator 307 which determines the distortion measures from the similarity values. Specifically, for e.g. the first frequency interval, a distortion measure is determined based on the similarity values, and specifically based on the similarity values for the first frequency interval.

In some embodiments, the second estimator is arranged to generate the distortion measure by combining similarity values for a plurality of the residual subband signals. Typically, the distortion measure is generated by combining all the similarity measures. As a specific example, the average or sum of all the similarity measures may be calculated and used as the distortion measure.

Thus, the distortion measure is generated to provide an indication of how much echo is generated outside of the first frequency interval from the rendering of the first frequency interval of the first audio signal. Such a frequency shift is associated with non-linear effects, and thus the distortion measure for the first frequency interval provides a strong indication of the non-linear echoes that are generated by the rendering of the first audio signal in the specific frequency interval.

As mentioned, a distortion measure may be generated for a plurality of frequency intervals covering a frequency range. Thus, the distortion measures may provide strong indications of the non-linear echoes that are generated by rendering of the first audio signal, and specifically of the strength of non-linear echoes generated by the individual frequency intervals. In some embodiments, the frequency range may include the entire audio frequency band. In other embodiments, only frequency ranges of particular interest are considered, such as e.g. only low and mid-range frequencies (as harmonics of higher frequencies may be substantially out of the hearing range).

In some embodiments, the distortion measure may be normalized, and specifically the calculated similarity values may be normalized relative to a power estimate indicative of the power of the first audio signal in the first frequency interval. Thus, if the first audio signal has a high signal energy within the first frequency interval, this is likely to result in relatively stronger echoes, including non-linear echoes. In order to estimate the non-linear effects, it may therefore be relevant to compensate the distortion measure for the first frequency interval for the energy/power in the first frequency interval. In some embodiments, the similarity values and/or the distortion measure may be scaled relative to the power of the first audio signal in the first frequency interval.

In some embodiments, the second estimator 307 may be arranged to generate the power estimate based on a linear power estimate reflecting an estimated power of the microphone signal within the first frequency interval. Thus, the similarity values/distortion measure may be compensated based on an estimated power of the linear echoes. This estimate could possibly be generated based on the received microphone signal. However, such an approach is likely to include a relatively high degree of noise since the microphone signal includes signal components from the near end audio environment, including for example a near end speaker.

Therefore, in many embodiments, the estimate may be generated based on the first compensation signal in the first frequency interval, i.e. it may be based on the filter parameters or output of the linear echo-cancellation filter 213 as well as the first audio signal in the first frequency interval.

In some embodiments, the similarity values/distortion measure may be compensated, or specifically scaled, relative to the total power of the first audio signal.

As mentioned, the distortion measure may be generated in response to similarity values for all subbands outside the first frequency interval. However, in some embodiments, the first estimator 219 may be arranged to select a subset of residual subband signals that are considered. Specifically, in some embodiments, the first estimator 219 may select subbands that have a suitable harmonic relationship to the first frequency interval, and consider only the corresponding residual subband signals.

For example, if the first frequency interval covers a frequency band of 500 Hz ±50 Hz, the second harmonic of any frequency in the first frequency interval will be in the range from 900 Hz-1100 Hz, and the third harmonic will be in the range from 1350 Hz-1650 Hz. In some embodiments, the first estimator 219 may only consider the non-linear echoes caused by second or third harmonics, and may accordingly only consider residual subband signals that overlap with one of these frequency intervals.

In many embodiments, this may cause an improved estimation of the non-linear echo effects. Specifically, for many non-linear effects, it is known that the resulting signal components are mainly second or third order harmonics, and by concentrating on the frequency bands in which these fall, the impact of other sounds may be reduced thereby resulting in reduced noise. Furthermore, a substantially reduced complexity and computational burden can be achieved in many embodiments.

The first estimator 219 may thus specifically generate distortion measures for a plurality of frequency intervals, and specifically for all frequency intervals within a given frequency range. These values are then used to adapt the echo suppression by the echo suppressor 207.

The echo suppressor 207 may specifically be arranged to separately adjust parameters of the echo suppression for each of the plurality of frequency intervals in response to the distortion measure for the frequency interval.

Thus, in such embodiments, the echo suppression in the first frequency interval may be dependent on a first distortion measure being the distortion measure calculated for the first frequency interval. This setting may in some embodiments be independent of the setting of e.g. parameters for a second frequency interval. For example, a gain may be set individually for each of a plurality of frequency intervals dependent on the distortion measure for that frequency interval.

In some embodiments, the echo reducer is arranged to modify the first audio signal dependent on the set of distortion measures prior to the rendering by the loudspeaker. Thus, in some embodiments, the echo suppressor 207 performs a pre-processing of the first audio signal before this is rendered. The parameters for this pre-processing is set by the set of distortion measures.

As a specific example, the echo suppressor 207 may be arranged to set a gain for each of a plurality of frequency bands based on distortion measures generated for the frequency bands. E.g. if the distortion measure for a given frequency interval increases, this indicates that the resulting non-linear echo caused by signal components in this frequency interval increases. Accordingly, the echo suppressor 207 may proceed to reduce the gain for this frequency interval. Similarly, if the distortion measure for the frequency interval reduces, the gain may be increased.

In many embodiments, the gain may only be adjusted if the corresponding distortion measure meets a criterion. For example, initially all gains may be set to a constant value. These values may be the default values which result in a flat frequency response, and thus in no degradation of the quality of the rendered signal.

However, if the distortion measure increases above a given threshold, this may indicate that the non-linear echo is unacceptable. Therefore, it may be preferred to reduce the gain for this frequency interval until the distortion measure drops below the threshold value. This may result in some coloration or distortion in the frequency response of the rendering but this may be preferred to unacceptable echoes being generated and fed back to the far end.

The echo suppressor 207 may e.g. individually control the gain for each individual frequency band such that the distortion measure for the frequency band is kept below the threshold.

In some embodiments, the same approach may be taken to adjust a clipping level for the individual subbands. For example, the system may be set with the clipping level for all frequency bands being at a level known to not result in any clipping even in the worst case scenario. However, if a distortion measure for a given frequency band increases above a threshold, the clipping level may be reduced until the distortion measure drops below the threshold again. Thus, the clipping level may be controlled to ensure that the non-linear echoes caused by the individual frequency bands are acceptable, and that distortion is only introduced if necessary.

It will be appreciated that the clipping may in some embodiments be a soft clipping. In some embodiments, an algorithm may be applied which adjusts both the gain and the clipping.

The approach may thus be used to control the non-linear echoes which are generated and may in particular dynamically adapt the echo suppression to the specific conditions experienced. In particular, it may allow the system to reduce the non-linear echoes at the expense of a reduction in audio quality. However, as the system can dynamically adapt to the specific conditions, the degradation of rendering quality can typically be minimized. Further, only relatively few frequency bands are typically required to be compensated and therefore the quality impact is typically acceptable or even non-perceptible. Furthermore, the impact is limited to the frequency bands which actually give rise to the non-linear echoes.

In certain embodiments of the invention, a minimum level of echo suppression is set in order to guarantee a certain level of audio quality by the system. Therefore, the residual signal may still contain non-linear echoes that could not be removed by the linear echo-cancellation filter 213 and compensator 215.

In some embodiments, the echo suppressor 207 may be arranged to perform echo suppression on the residual signal, where the echo suppression may be based on the similarity measures.

For example, the echo suppressor 207 may in this example generate distortion measures for each residual subband signal. E.g. for a first residual subband signal, the similarity measures for all pairs of subbands of the first audio signal and the first residual signal may be combined (e.g. added or averaged). The resulting distortion measure may thus be indicative of the amount of echo that is present in a first frequency interval of the residual signal from signal components of the first audio signal that are outside the first frequency interval. Thus, a distortion measure is generated which is indicative of the amount of non- linear echoes that are present in the first residual subband signal.

In another example, the echo suppressor 207 may generate distortion measures based on the sum of weighted first audio signal subbands, where the weight for each subband is determined by the similarity measure between a first audio signal subband and the residual signal subband.

The post-processing may then be modified dependent on the distortion measure. Specifically, the gain for the first frequency interval/first residual subband signal is set dependent on the calculated distortion measure. Specifically, if the distortion measure is below a threshold (indicating that the combination of the non-linear echoes is below a given level), a nominal gain is applied. However, if the distortion measure rises above the threshold (indicating that the non-linear echoes are above a given level), the gain is reduced, thereby reducing the perceptible effect of the non-linear echoes (at the expense of a distortion to the frequency response).

Thus, in some embodiments similarity values for pairs of subband signals may be combined into distortion measures that are related to the first audio signal. Specifically, a distortion measure may be calculated for a number of subbands of the first audio signal. For each subband of the first audio signal, the distortion measure is calculated by combining the similarity values calculated for the subband signal of this subband and all the residual subband signals for subbands with different frequencies.

These distortion measures may then be used to adapt the pre-processing, e.g. by setting gains for each subband of the first audio signal.

In some embodiments, similarity values for pairs of subband signals may be combined into distortion measures that are related to the residual signal. Specifically, a distortion measure may be calculated for a number of subbands of the residual signal. For each subband of the residual signal, the distortion measure is based on a combination of similarity values calculated for the residual subband signal of this subband, and all the subband signals of the first audio signal for subbands with different frequencies.

For example, in some embodiments, the distortion measure may be calculated as the combined sum of the similarity values, and the gain for the corresponding subband of the residual signal may be set depending on this similarity value. As another example, the distortion measure may be calculated as the sum of the similarity values for each subband of the first audio signal (not coinciding with the residual subband signal) and the amplitude of that subband of the first audio signal. Thus, the distortion measure may be based on the combination of the first subband signals (at other frequencies) scaled or weighted by the similarity measures between those first subband signals and the residual signal. In such embodiments, the distortion measure may indeed be considered a direct estimate of the non-linear echoes in the individual residual subband signal.

These distortion measures may then be used to adapt the post-processing, e.g. by setting gains for each subband of the residual signal. In the example where the distortion measure is generated as a direct estimate of the non-linear echoes, the distortion measure may indeed be used directly in the post-processing, for example by subtracting the distortion measure of the individual residual subband signal from the residual subband signal.

It will be appreciated that in some embodiments, distortion measures may only be generated with reference to the first audio signal. For example, some embodiments may only include pre-processing and no post-processing.

In other embodiments, distortion measures may only be generated with reference to the residual signal. For example, some embodiments may only include pre-processing and no post-processing.

Advantageously, in some embodiments, distortion measures may be generated with reference to both the first audio signal and the residual signal. For example, some embodiments may include both pre-processing and post-processing. Indeed, a particular advantage of the described distortion measure based approach is that it allows for an efficient and high performance interaction between the pre- and post-processing, and in particular provides an efficient way of controlling and distributing the echo suppression between the two processes.

In the following, a specific example wherein echo suppression is performed as a pre-processing approach will be described in detail.

Specifically, description and analysis of a subband-based approach to pre-processing a far-end signal to reduce the nonlinear distortion produced by an audio communication device's loudspeaker will be provided. The described approach evaluates the correlations between signal events and characteristics in a far-end subband signal (corresponding to the described first subband signal) and a multitude of residual subband signals (corresponding to the described residual subband signals). These correlations are used as similarity values and are used to derive a distortion measure that quantifies the influence of each far-end subband on the resulting distortion in the residual signal. By adapting the parameters of a pre-processor function, the goal of the overall system is to minimize the resulting nonlinear distortion, and in the specific example while maximizing the linear acoustic echo component.

Firstly, the underlying model of nonlinear distortion will be presented.

The acoustic echo cancellation system illustrated in FIG. 1 may be considered. Here, $x(n)$, $e(n)$, $z(n)$, and $r(n)$ denotes the far-end signal (the first audio signal), the echo signal, the microphone signal, and the acoustic echo canceller (AEC) residual signal, respectively.

The AEC is assumed to be implemented using a linear adaptive filter in the frequency or time domain and employing an algorithm such as the Normalized Least Mean Squares (NLMS) algorithm to control the updating of the filter coefficients/parameters. As such, the adaptive filter only models the linear portion of the acoustic echo path, producing the estimate $\hat{y}(n)$.

The time-domain acoustic echo canceller residual signal is given by $$r(n) = z(n) - \hat{y}(n). \quad (1)$$

If the signals are analyzed using a filter-bank or another frequency-domain decomposition producing subbands k, such that 1<k<M, then (1) can be written as $$R(k) = Z(k) - \hat{Y}(k). \quad (2)$$

In the absence of a near-end speech signal or local disturbance such as noise, the microphone subband signal $Z(k)$ only consists of an echo component $E(k)$ which can further be decomposed into a linear and nonlinear portion, i.e., $$Z(k) = Y(k) + Y_{nl}(k) \quad (3)$$
$$= Y(k) + H(k)X_{nl}(k),$$

and the linear echo component $Y(k) = H(k)X(k)$, where it is assumed that the non-linear effect is predominantly due to power amplifier and loudspeaker non-linearities, and that accordingly the non-linear signal components are subject to the transfer function from the loudspeaker to the microphone.

The subband residual signal is accordingly given by $$R(k) = [Y(k) - \hat{Y}(k)] + H(k)X_{nl}(k). \quad (4)$$

If it is further assumed that the acoustic echo canceller accurately models the linear portion of the acoustic echo, i.e. $\hat{Y}(k) \approx Y(k)$ then $$R(k) = H(k)X_{nl}(k), \quad (5)$$

leaving only the nonlinear portion of the total acoustic echo present in the residual. Thus, in this scenario, the residual signal comprises only the non-linear echoes An expression for $X_{nl}(k)$ depends on the assumed underlying model of nonlinear distortion.

Typically, harmonic models are used to describe the nonlinear characteristics of loudspeaker systems, particularly at low frequencies. For these low frequencies (below resonance) the restoring force of the suspension system can be approximated by a polynomial function of the loudspeaker's cone displacement, which results in the generation of spectral components at multiples of the fundamental frequency.

Speech articulators move at rates ranging from 2 to 20 Hz and produce slow modulations in the speech envelope. These modulations contain phonetic information about the speech signal and are known to be immune to degradations in harsh acoustic environments which include background noise and reverberation.

In the specific example described, similarity values and distortion measures are calculated for the subbands of the first audio signal by considering the slow modulations in the speech envelope. Specifically, the correlations between modulations in the envelope of the subband signals of the first audio signal and of residual subband signals are determined and used as similarity values. These correlations are then combined into the distortion measures.

Accordingly, a (speech modulation) envelope signal is generated for each subband. This may specifically be achieved by first generating the individual subbands, e.g. by a filter bank.

In some embodiments, the signals are processed based on a set of equi-spaced, equi-bandwidth subband signals generated using a uniform filter-bank, such as a DFT or a STFT.

In other embodiments, a non-uniform filter-bank, such as a warped filter-bank with finer frequency resolution at low frequencies and coarser frequency resolution at higher frequencies, is used. A non-uniform filter-bank, such as the warped DFT filter-bank, has the advantage that it can use fewer subbands to analyze and resynthesize a signal of interest, meaning that complexity can be reduced.

Depending on the employed filter-bank, the group delay within each subband can be different, requiring the use of a delay element per subband before frequency synthesis or a compensation filter after frequency synthesis to achieve proper reconstruction of the signal. However, in the specific example, the proposed processing makes use of the subband signals' envelopes, and accordingly the actual delay values do not have to be very accurate, as long as the envelopes are properly aligned.

Another form of delay compensation may be included due to the acoustic echo path and other signal processing components in the loudspeaker and microphone paths introducing a delay. This ensures that the correlated envelopes of the fundamental frequencies in the loudspeaker signal are properly aligned with the distortion envelopes in the enhanced output signal, e.g. the residual signal.

After the signals of interest have been decomposed into a set of (complex) subbands, the envelope of each channel is computed in the specific example.

Depending on the type of filter-bank (critically sampled vs. oversampled), this can involve the following steps:

Compute the absolute value (magnitude) of the complex-valued signal in each subband.

Low-pass filter the magnitude signal.

For oversampled filter-banks, the resulting signal can be downsampled.

The low-pass filter performs a smoothing of the subband envelope so that only variations in the modulation envelope of speech are captured. A low-pass filter with a cutoff frequency of 16-20 Hz can often advantageously be used to achieve this. Low-pass filtering the subband amplitudes may or may not be essential in certain embodiments of the proposed invention.

Using a DFT filter-bank, or by simply applying the short-time Fourier Transform (STFT), the downsampling is usually inherent in the transform or present in the filter-bank structure. For a (oversampled) warped filter-bank, the downsampling may be explicitly carried out when calculating the envelope. Downsampling may or may not be required in certain embodiments of the invention, and depends on the low-pass filtering operation. If the subband signals are low-pass filtered, then downsampling can reduce computational complexity, especially if a large number of subbands are considered.

In some embodiments, the envelopes in adjacent subbands may be combined (typically by summation or averaging) in order to reduce the number of envelope signals considered in the subsequent processing.

In the specific example, the following processing may be applied to generate envelope subband signals:
  Half or full-wave rectification of the subband signal.
  Smoothing of the rectified signal using a low-pass filter.
  Downsampling the smoothed signal.
  High-pass filtering or differentiation of the smoothed signal to produce a zero- mean envelope.

The resulting subband signals typically comprise activity bursts associated with phonetic events. The shape and localization in time of these events may in the specific example form the basis of the generation of similarity values. Thus, the similarity values may be generated to reflect the correlation among events in the subbands of the far-end signal (the first audio signal) and events across corresponding (e.g. harmonic) subbands of the AEC residual signal.

Let $\tilde{X}(k)$, $\tilde{X}_{nl}(k)$, $\tilde{Y}(k)$, and $\tilde{R}(k)$ denote the envelopes of $X(k)$, $X_{nl}(k)$, $Y(k)$, and $R(k)$, respectively. Then the residual envelope can be written in terms of the nonlinear far-end envelope:

$$\tilde{R}(k) = H(k)\tilde{X}_{nl}(k), \tag{6}$$

where it is assumed that the value of $H(k)$ changes at a much slower rate than $\tilde{X}_{nl}(k)$.

With an additive harmonic distortion model, the nonlinear far-end envelope $\tilde{X}_{nl}(k)$ can be written in terms of the fundamental frequencies that contribute to its energy $$\tilde{X}_{nl}(k) = \sum_{m \neq k} a_{k,m} \tilde{X}(m). \tag{7}$$

The real coefficients $a_{k,m}$ relate the portion of the far-end first signal subband $m = k/q$, $m \neq k$ for some integer $q = 2, 3, \ldots, N_{har}+1$ to its harmonic subband k in the captured echo signal. $N_{har}$ denotes the number of harmonics considered in the model.

Given the expression for the residual nonlinear acoustic echo in (6), the residual envelope, $\tilde{R}(k)$ is:

$$\tilde{R}(k) = H(k) \sum_{m \neq k} a_{k,m} \tilde{X}(m). \tag{8}$$

Figure 4:
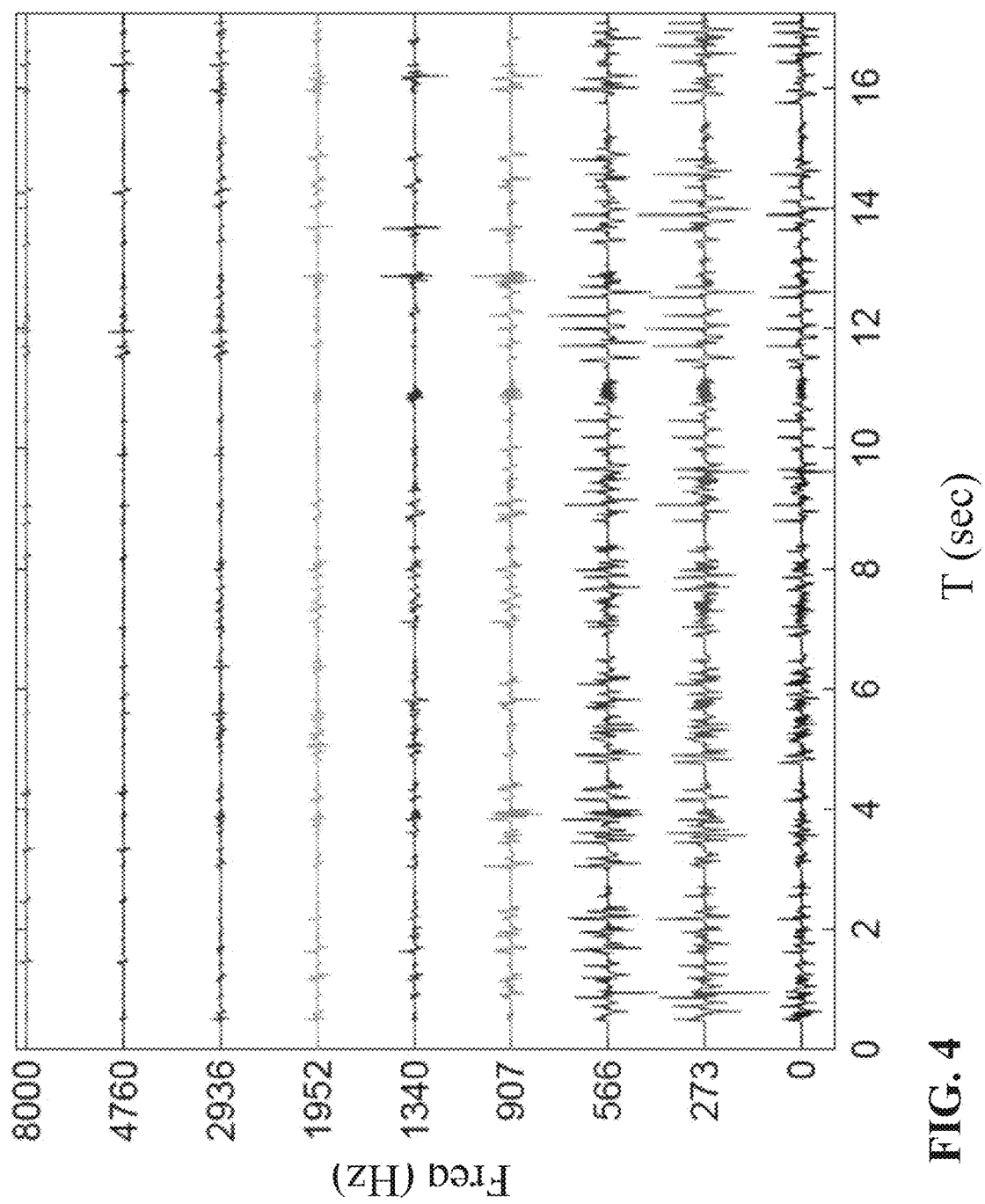
FIG. 4 illustrates examples of subband signals for an input audio signal to the echo-suppressor of FIG. 2.
Figure 5:
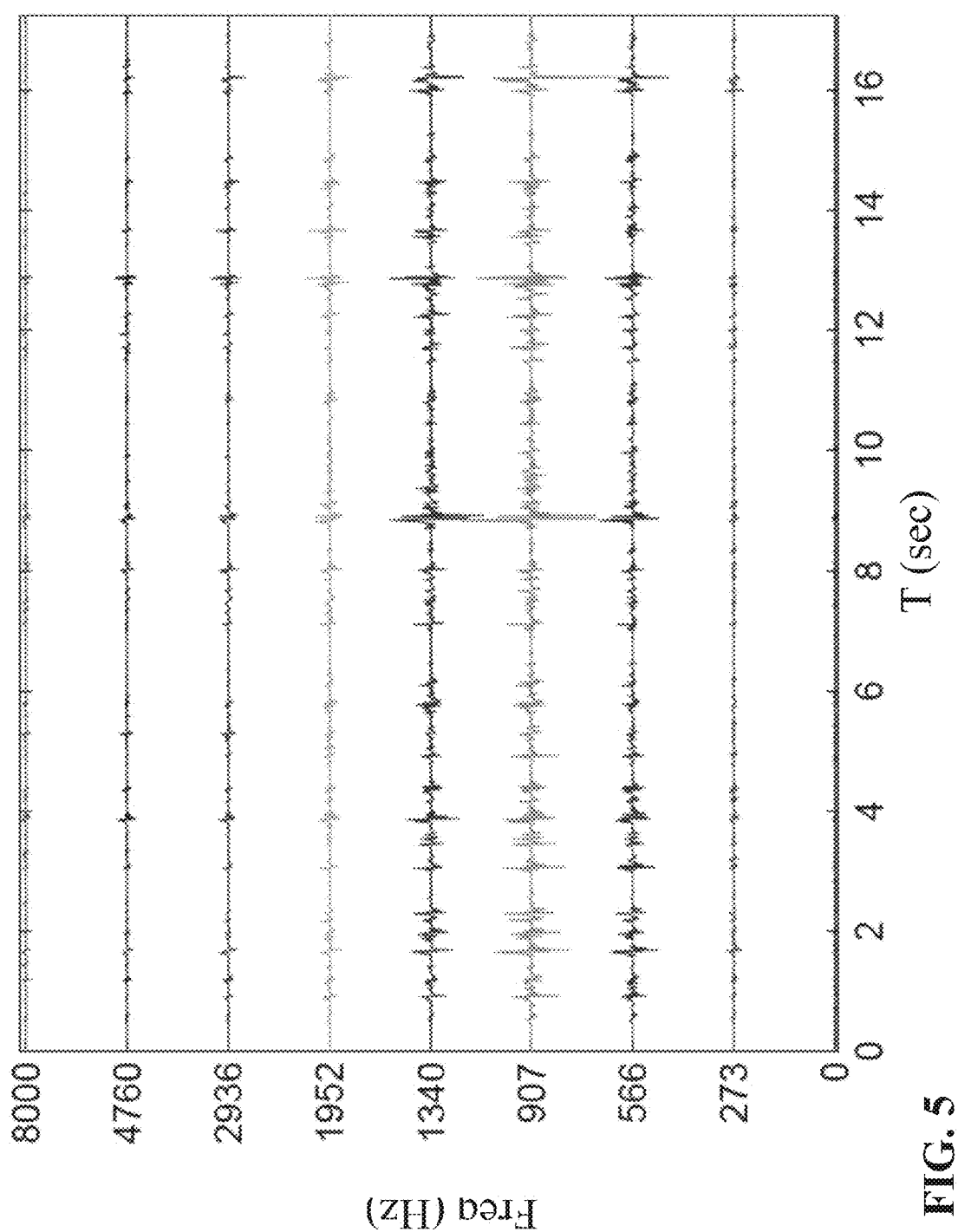
FIG. 5 illustrates examples of subband signals for a residual audio signal of the echo-suppressor of FIG. 2.

FIGS. 4 and 5 illustrate examples of smoothed and downsampled subbands for the first audio signal and the residual signal respectively. In the example, the subband signals are generated using a 16-channel Warped Discrete Fourier Transform (DFT) filter-bank. It may be noted that there are correlations between far-end subband envelopes (i.e. different subbands of the first audio signal), as well as between far-end and residual subbands envelopes (i.e. between subband signals of the first audio signal and of the residual signal).

It is known that the correlation between envelopes of speech subbands tend to decrease as the difference between the subband center frequencies increases. Therefore, to simplify an initial analysis, it is firstly assumed that the far-end subband envelopes (the first audio signal subband signals) are uncorrelated so that the product terms $b_{k,m} = H(k)a_{k,m}$ can be estimated as:

$$\hat{b}_{k,m} = \frac{E\{\tilde{R}(k)\tilde{X}(m)\}}{E\{|\tilde{X}(m)|^2\}}. \tag{9}$$

If the envelopes are processed in (overlapping) blocks of length N, then (9) can be written as $$\hat{b}_{k,m}(\kappa) = \frac{\tilde{X}^T(m;\kappa)\tilde{R}(k;\kappa)}{\tilde{X}^T(m;\kappa)\tilde{X}(m;\kappa)}, \tag{10}$$

with κ denoting the block index.

These values, i.e. $\hat{b}_{k,m}$, may be used directly as the similarity values. Thus, $$\text{Sim}(k,m) = b_{k,m}. \tag{11}$$

In many embodiments, the system may include an adaptable pre-processing gain for each subband signal denoted by $G_{pre}(m)$. In this case, the gain is set based on the distortion measures, and thus an adaptive feedback loop may be generated.

If the pre-processor function is given by a gain function $G_{pre}(m)$ such that $X_p(m) = G_{pre}(m)X(m)$ and thus $\tilde{X}_p(m) = G_{pre}(m)X(m)$, then substituting the value of $\tilde{R}(k)$ into (10) or (11) results in the following similarity values:

$$\text{Sim}(k,m) = a_{k,m} H(k) G_{pre}(m), \ m \neq k \tag{12}$$

The correlation measure Sim(k,m) for m=k corresponds to the linear relationship between $\tilde{X}(m)$ and the linear echo component remaining in the residual signal $Y(k) - \hat{Y}(k)$, i.e. the amount of linear echo that could not be suppressed due to the linear model mismatch between the linear acoustic echo canceller and true echo path.

Typically, the processing may be block based and the similarity values/cross correlations may be based on this block processing. Typical block lengths are 10-50 ms.

As another example, the similarity value, $\text{Sim}_{k,m}$ may be calculated over a number of blocks as $$\text{Sim}_{k,m}(\kappa) = \frac{\sum_\kappa \tilde{X}(m; i_{max})\tilde{R}(m; i_{max})}{\sum_\kappa \tilde{X}(m; i_{max})\tilde{X}(m; i_{max})}, \tag{13}$$

where $i_{max}$ corresponds to the sample index within block κ where the peak value of $\tilde{X}(m;\kappa)$ is located.

As mentioned, FIGS. 4 and 5 illustrate smoothed and downsampled envelopes of the 9 positive-frequency channels resulting from a 16-channel Warped DFT filter-bank (16-kHz sampling frequency) with FIG. 4 illustrating the subband signals of the first audio signal, i.e. $\tilde{X}(\kappa)$, and FIG. 5 illustrating the subband signals of the residual signal, i.e. $\tilde{R}(\kappa)$. The signal length is approximately 19 sec. Most notable harmonic components can be observed at T=16 seconds, where an event in the subband with center frequency 1340 Hz is clearly correlated to the event in the residual subband signal centered at 1952 Hz. Other correlated events exist between e.g. subbands centered at 907 and 1340 Hz.

A possible distortion measure for subband m of the first audio signal may e.g. be generated as the ratio of the total nonlinear acoustic echo power to the total echo power (linear and nonlinear) produced by subband m (and thus similarly to the approach for determining a total harmonic distortion (THD)).

For example, the following distortion measure may be calculated:

$$I(m) = \frac{\sum_{k \neq m} P_q(m)}{\sum_k P_q(m)}, qm = k \qquad (14)$$

$$= \frac{\sum_{k \neq m} a_{k,m}^2 \tilde{X}^2(m)|H(k)|^2}{\tilde{X}^2(m)|H(m)|^2 + \sum_{k \neq m} a_{k,m}^2 \tilde{X}^2(m)|H(k)|^2}$$

$$\approx \frac{\sum_{k \neq m} \hat{b}_{k,m}^2}{|H(m)|^2 + \sum_{k \neq m} \hat{b}_{k,m}^2}$$

where $P_q(m)$ represents the power of the $q^{th}$-order harmonic of subband m. The value of I(m) is bounded between 0 and 1, with I(m)=0 translating to no harmonic distortion and I(m)=1 to 100% distortion.

For the variable pre-processing gain example, the distortion measure may be calculated as a THD estimate according to:

$$THD(m) = \frac{\sum_{k \neq m} P_q(m)}{\sum_k P_q(m)}, qm = k \qquad (15)$$

$$\approx \frac{\sum_{k \neq m} a_{k,m}^2 |\tilde{X}_p(m)|^2 |H(k)|^2}{|\tilde{X}_p(m)|^2 |H(m)|^2 + \sum_k a_{k,m}^2 |\tilde{X}_p(m)|^2 |H(k)|^2}$$

$$= \frac{\sum_{k \neq m} a_{k,m}^2 |H(k)|^2 G_{pre}^2(m)}{|H(m)|^2 G_{pre}^2(m) + \sum_k a_{k,m}^2 |H(k)|^2 G_{pre}^2(m)}$$

$$= \frac{\sum_{k \neq m} \text{Sim}^2(k, m)}{|H(m)|^2 G_{pre}^2(m) + \sum_k \text{Sim}^2(k, m)},$$

In block form, the distortion measure may be represented as:

$$I(m; \kappa) = \frac{\sum_{k \neq m} \text{Sim}_{k,m}^2(\kappa)}{|H(m)|^2 G_{pre}^2(m) + \sum_k \text{Sim}_{k,m}^2(\kappa)}. \qquad (16)$$

The value of H(m) can be estimated using the far-end and linear adaptive filter output signals $$\hat{H}(m) \approx \sqrt{\frac{\|\tilde{Y}(m)\|_2^2}{\|\tilde{X}(m)\|_2^2}}, \qquad (17)$$

with $\tilde{Y}(m)$ denoting a block of the adaptive filter's output envelope.

The term $|H(m)|^2 G_{pre}^2(m)$ can be estimated from the linear adaptive filter's impulse response and pre-processor gain function, or simply as:

$$|H(m)|^2 G_{pre}^2(m) = \frac{|\tilde{Y}(m)|^2}{|\tilde{X}(m)|^2}. \qquad (18)$$

The total harmonic distortion (THD) measure relates the percentage of input power that is reproduced as harmonic distortion. Since this distortion is mainly caused by high far-end signal amplitudes that produce large loudspeaker excursions, it is assumed that the observed THD values can be reduced by attenuating or limiting those subbands m with high THD values.

In the example, eq. (11) may be used to calculate the distortion measure for subband m by combining the similarity values of eqs. (9) and (10) for the subbands k where k≠m. Furthermore, the distortion measure is normalized with respect to the total estimated echo power where the echo power for the linear echoes are determined from a power of the compensation signal.

In some embodiments, the cross-correlation measure is only updated if activity is detected in the given input. This activity measure can be based on a noise-floor per subband, where the noise floor is estimated e.g. using minimum statistics methods.

The cross-correlation measure between the envelopes $\tilde{X}(m;\kappa)$ and $\tilde{R}(k;\kappa)$ provides an estimate of the harmonic relationship between the input subband m and residual subband k, and provides a suitable measure for the similarity values. However, it will be appreciated that other similarity measures may be used in other embodiments.

One such measure may be based on specific features of the blocks of the first audio signal and residual signal, such as the number of local maxima and minima within a block, or the onset/offset times of active regions within a subband, in which case a binary similarity value of 0 or 1 can be used. For binary-valued similarity measures, the value of H(m) may be set to 1. In case binary similarity values are used, the distortion measure can e.g. be calculated by either taking the maximum or the sum of the similarity measures for subband m:

$$I(m; \kappa) = \frac{\max_{k \neq m} \text{Sim}_{k,m}(\kappa)}{1 + \max_k \text{Sim}_{k,m}(\kappa)} \qquad (19)$$

$$I(m; \kappa) = \frac{\sum_{k \neq m} \text{Sim}_{k,m}(\kappa)}{1 + \sum_k \text{Sim}_{k,m}(\kappa)} \qquad (20)$$

or as the maximum/average values of the similarities across subbands m:

$$I(m;\kappa) = \max_{k \neq m} \text{Sim}_{k,m}(\kappa) \quad (21)$$

$$I(m;\kappa) = \frac{\sum_{k \neq m} \text{Sim}_{k,m}(\kappa)}{K(m)}, \quad (22)$$

Where K(m) denotes the number of harmonics influenced by subband m.

Figure 6:
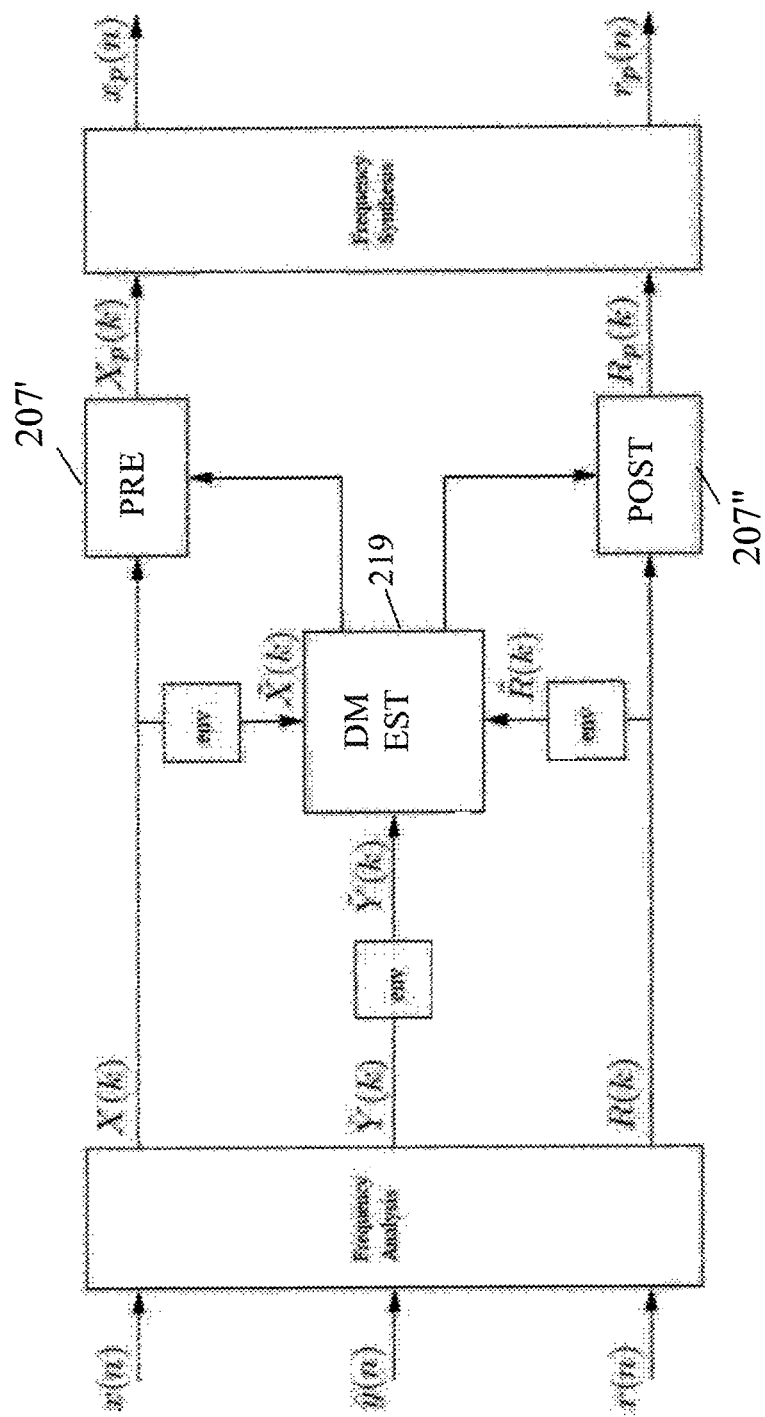
FIG. 6 illustrates some elements of an exemplary echo suppressor in accordance with some embodiments of the invention.

In the specific example, the echo suppression is performed by the echo suppressor 207' performing a pre-processing. The approach will specifically be described with respect to the equivalent circuit of FIG. 6.

The pre-processor function applied by the echo suppressor 207' may be a linear or nonlinear function of the first audio signal x(n).

Denoting the pre-processing function as $X_p(m)=F\{X(m)\}$, the nonlinear residual echo component in (8) can be rewritten as $$\tilde{R}(k) = H(k) \sum_{m \neq k} a_{k,m} \tilde{X}_p(m), \quad (23)$$

to reflect the fact that the residual echo now depends on the modified first audio signal (the pre-processed far-end signal) $X_p(m)$.

The similarity values $H(k)a_{k,m}$ can also be estimated using the normalized cross-correlation equation in (9) with respect to $X_p(m)$ instead of X(m).

However, this may in some scenarios result in an over estimation of the echoes due to very low-amplitude subbands of the first audio signal. To address this, the distortion measure may only be calculated for subbands that contain some level of activity, and furthermore, the amount of attenuation introduced by the pre-processing may be limited to a minimum value. The coefficients $b_{k,m}$ may also be determined by a joint estimation using a least-squares or least mean squares method.

For example, a weight update equation may be given as:

$$b_{i+1}(k) = b_i(k) + \mu \frac{e(k)}{\|\tilde{X}_{p,i}\|^2} \tilde{X}_{p,i}, \quad (24)$$

with μ being a parameter adjusting the update rate and $$e(k) = \tilde{R}_i(k) - b_i^T(k)\tilde{X}_{p,i}, \quad (25)$$

In the following, two subband pre-processing functions directed at reducing the amount of nonlinear distortion produced by a device's loudspeaker will be described. The optimization of the pre-processing parameters is based on the assumption that there is some maximum gain or limit that can be applied to a first audio signal subband's magnitude such that the amount of nonlinear distortion is reduced to be within some user-defined threshold.

In mathematical terms, if the coefficients $a_{k,m}=f\{X_p(m)\}$ then the contributions $a_{k,m}X_p(m)$ will be negligible for some optimal pre-processing function with $X_p(m)>0$. In other words, $a_{k,m}X_p(m)=f\{X_p(m)\}X_p(m)$ is assumed to be a monotonically increasing function of $X_p(m)$ which approaches zero for decreasing $X_p(m)$, and for which $a_{k,m}$ decreases faster than $X_p(m)$.

First, a linear pre-processing consisting of an adaptive real-valued subband gain function will be described.

In this case, the pre-processing is given by a real gain function G(m) such that $$X_p(m) = G(m)X(m) \quad (26)$$

It follows that the subband envelopes are given as $\tilde{X}_p(m) = G(m)\tilde{X}(m)$.

The pre-processing seeks to derive a set of real gain values such that the distortion caused by the (global) maximum far-end magnitude is below some threshold subject to the constraint that the linear acoustic echo component is maximized.

These requirements translate to finding the maximum gain value such that the influence of the pre-processed far-end subband envelope is below some threshold. If it is assumed that the influence is an increasing function of the corresponding magnitude, then this maximum gain value should be a function of both the global maximum far-end magnitude and the largest magnitude value for which the distortion measure is just small enough to meet the distortion threshold requirement, i.e., $$G(m;\kappa) = \frac{c(m;\kappa)}{\alpha X_{max,g}(m;\kappa)}, \quad (27)$$

where c(m;κ) corresponds to the maximum value of |X(m;κ)| such that $I(m) \leq I_{min}$, where $I_{min}$ is the distortion measure threshold ($0 \leq I_{min} \ll 1$).

If, for the current envelope block κ, $I(m;\kappa) \leq I_{min}$, and the current local maximum magnitude (not envelope) $X_{max}(m;\kappa)$ is greater than c(m;κ−1), then $$c(m;\kappa) = \beta_c c(m;\kappa-1) + (1-\beta_c) X_{max}(m;\kappa) \quad (28)$$

where $\beta_c$ is a smoothing constant ($0 < \beta_c < 1$) with a value close to unity.

If $I(m;\kappa) > I_{min}$, then $$c(m;\kappa) = \max\{c_{min}(m), \beta_d c(m;\kappa-1)\}, \quad (29)$$

where $\beta_d$ is a decay factor ($0 < \beta_d < 1$) with a value close to unity, and $c_{min}(m)$ is a minimum tolerable limiting value which may be subband-dependent.

The local maximum magnitude (not envelope) in (28) for block κ of subband m is given by $$X_{max}(m;\kappa) = \max|X(m;\kappa)|. \quad (30)$$

$X_{max,g}(m;\kappa)$ in (29) denotes the global maximum magnitude in subband m.

A value of α=1 ensures that the maximum peak within a given subband does not introduce distortion beyond that set by $I_{min}$. For $0<\alpha<1$ this strict requirement is relaxed, while $\alpha>1$ provides over-attenuation.

The estimated gain levels are typically also smoothed in time to prevent sporadic changes in the output signal, $$G'(m;\kappa) = \gamma G(m;\kappa) + (1-\gamma) G(m;\kappa-1) \quad (31)$$

where $0<\gamma<1$, with typical values of γ closer to 1.

As another example, the pre-processing may be a nonlinear function, such as a clipping function.

Specifically, rather than estimating a real-valued gain function based on the global peak magnitude value and c(m;κ) in (27), the value of c(m;κ) may be used directly to clip the magnitude of X(m).

The output signal may then be determined as:

$$X_p(m;\kappa) = F\{|X(m;\kappa)|; c(m;\kappa)\}\frac{X(m;\kappa)}{|X(m;\kappa)|}, \quad (32)$$

where $F\{\cdot\}$ is a hard/soft clipping function, or a compressor with a fixed compression factor and adaptive threshold.

As shown in (32), for complex-valued subbands, this function is applied to the magnitude of the subband, and the result is then combined with the original phase.

The estimated clipping levels may typically be smoothed in time to prevent sporadic changes in the output signal, e.g. as:

$$c'(m;\kappa) = \gamma c(m;\kappa) + (1-\gamma)c(m;\kappa-1) \quad (33)$$

where $0 < \gamma < 1$, with typical values of $\gamma$ closer to 1.

It should be noted that in these examples, the distortion measure is based on the pre-processed/modified first audio signal envelope $\hat{X}_p(k)$. However, the pre-processor function is actually derived from the magnitude of the first audio signal $X(k)$. This may ensure a stable adaptation of the pre-processor parameters.

In some embodiments, the echo suppression may be a post-processing of the residual signal by the echo suppressor 207''.

The similarity measures computed in (10) can also be used to estimate the nonlinear acoustic echo component, $$\hat{Y}_{nl}(k) = H(k)\sum_m a_{k,m} X_p(m) \quad (34)$$

$$= \sum_m \mathrm{Sim}(k,m) X_p(m)$$

In some embodiments, this estimate for the non-linear echo may directly be used as a distortion measure. Thus, in the specific example, the distortion measure for residual subband k may be calculated as the sum of the similarity values for each subband of the first audio signal (not coinciding with the residual subband signal) multiplied by the amplitude of that subband of the first audio signal. Rewriting the above equation in matrix form, $$Y_{nl}(\kappa) = A(\kappa) X_p(\kappa), \quad (35)$$

where row k of the M-by-M matrix A contains the similarity measures between $X(m)$ and $R(k)$ for $m \neq k$.

The entries in A can be smoothed over time, $$A(\kappa) = \xi A(\kappa) + (1-\xi)A(\kappa-1) \quad (36)$$

where $0 < \xi < 1$.

The estimate $\hat{Y}_{nl}(k)$ may then as a specific example be used in a spectral subtraction scheme to derive a post-processer gain function. The presence of reverberation smears out the envelopes within each subband to varying degrees depending on the subband. Since the proposed pre-processor gain function is based on maximum statistics, its performance is quite robust in different acoustic environments. However, gain estimation accuracy can be improved by modeling the effects of reverberation when computing the similarity between $X(m)$ and $R(k)$. For post-processing, incorporating a model of reverberation can significantly improve nonlinear acoustic echo suppression performance.

The gain value for the subband may then e.g. be determined as:

$$G_{post}(k) = \frac{|R(k)| - \gamma_{os}|\hat{Y}_{nl}(k)|}{|R(k)|}, \quad (37)$$

where $\gamma_{os}$ is an over-subtraction factor with $\gamma_{os} \geq 1$. It is common to also limit the lower bound on the calculated gain $G_{post}(k)$, i.e.

$$G'_{post}(k) = \max(G_{post}(k), \min(k)). \quad (38)$$

Thus, in these examples a distortion measure is calculated for each residual subband signal by a combination of similarity values for pairings of the residual subband and subbands of the first audio signal with different frequencies. Thus, a distortion measure is generated for a frequency interval of the residual signal, where the distortion measure is indicative of the non-linear distortion introduced to the residual signal in this frequency interval. The gain for that frequency interval is then set in response to this distortion value. Specifically, the gain is reduced for increasing distortion.

In some embodiments, the system may perform echo suppression as a joint pre-processing and post-processing. Initially, all pre-processing gains may be constant and thus the non-linear echoes must be handled by the post-processing. However, as the pre-processor gains adapt and reduce the resulting nonlinear distortion, the similarity measure values between X and R decrease, and thus $A(\kappa) \rightarrow 0$. This means that initially the post-processor will do most of the job in removing the nonlinear acoustic echo as these are not initially avoided by the pre-processing gains. However, once the pre-processing has adapted and reduced the nonlinear distortion, the compensation by the post-processor gain function is automatically reduced as a result of the lower similarity measure values.

In some embodiments, the system may measure the near-end speech signal to nonlinear echo power ratio of the residual signal. If this ratio is above a certain threshold, then the amount of suppression of the first audio signal can be reduced. If, however, this ratio is below a certain threshold, then further suppression of the residual signal can lead to unwanted distortion of the desired near-end speech signal. Therefore, in this case, the amount of suppression of the first audio signal can be increased. In this way, the system effectively balances the amount of near-end speech distortion transmitted to the far-end and the amount of nonlinear distortion produced by the loudspeaker.

In some embodiments, the similarity values may take into account a reverberation estimate. Indeed, the presence of reverberation tends to smear out the envelopes within each subband to varying degrees depending on the subband. Since the proposed pre-processing gain function is based on maximum statistics, its performance is quite robust in different acoustic environments. However, gain estimation accuracy can be improved by modeling the effects of reverberation when computing the similarity between $X(m)$ and $R(k)$. For post-processing, incorporating a model of reverberation can significantly improve nonlinear acoustic echo suppression performance.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An audio echo suppressor comprising:
a first receiver for receiving a first audio signal for rendering by a loudspeaker;
a second receiver for receiving a microphone signal;
a linear echo-cancellation filter for generating a first compensation signal from the first audio signal;
a compensator for generating a residual signal by subtracting the first compensation signal from the microphone signal;
a first adapter for determining a set of filter parameters for the linear echo-cancellation filter in response to the residual signal;
a first estimator configured to generate a set of at least one distortion measure providing indication of non-linear distortion which is caused by rendering of signal components in a first frequency interval of the first audio signal, a distortion measure of the set of at least one distortion measure being indicative of a contribution to the residual signal in at least one frequency interval that is outside the first frequency interval; and
an echo reducer configured to perform echo suppression in response to the set of at least one distortion measure, wherein the first estimator comprises a comparator for determining a similarity measure for the residual signal not belonging to the first frequency interval, the similarity measure for the residual signal being indicative of a similarity of the residual signal and the first audio signal.

2. An audio echo suppressor comprising:
a first receiver for receiving a first audio signal for rendering by a loudspeaker;
a second receiver for receiving a microphone signal;
a linear echo-cancellation filter for generating a first compensation signal from the first audio signal;
a compensator for generating a residual signal by subtracting the first compensation signal from the microphone signal;
a first adapter for determining a set of filter parameters for the linear echo-cancellation filter in response to the residual signal;
a first estimator configured to generate a set of at least one distortion measure providing indication of non-linear distortion which is caused by rendering of signal components in a first frequency interval of the first audio signal, a distortion measure of the set of at least one distortion measure being indicative of a contribution to the residual signal in at least one frequency interval that is outside the first frequency interval; and
an echo reducer configured to perform echo suppression in response to the set of at least one distortion measure, wherein the first estimator comprises:
a first subband generator for generating a first subband signal for the first frequency interval from the first audio signal;
a second subband generator for generating a plurality of residual subband signals from the residual signal;
a comparator for determining a similarity measure for at least some residual subband signals not belonging to the first frequency interval, the similarity measure for a residual subband signal being indicative of a similarity of the residual subband signal and the first subband signal; and
a second estimator for determining the distortion measure for the first frequency interval from the similarity values.

3. The audio echo suppressor of claim 2 wherein the comparator is configured to generate the similarity measure for a first residual subband signal in response to a similarity of signal variations of the first subband signal and signal variations of the first residual subband signal.

4. The audio echo suppressor of claim 2 wherein the comparator is configured to generate the similarity measure for a first residual subband signal in response to a cross correlation of the first subband signal and the first residual subband signal.

5. The audio echo suppressor of claim 2 wherein the first estimator is configured to generate distortion measures for a plurality of frequency intervals, and the echo reducer is configured to separately adjust parameters of the echo suppression for each frequency interval of the plurality of frequency intervals in response to the distortion measure for the frequency interval.

6. The audio echo suppressor of claim 2 wherein the second estimator is configured to generate the distortion measure by combining similarity values for a plurality of the at least some residual subband signals.

7. The audio echo suppressor of claim 2 wherein the second estimator is configured to normalize the distortion measure with respect to a power estimate for contributions to the microphone signal from signal components of the first audio signal within the first frequency interval.

8. The audio echo suppressor of claim 7 wherein the second estimator is configured to generate the power estimate in response to a linear echo power estimate for the first frequency interval, the linear echo power estimate being generated in response to the set of filter parameters.

9. The audio suppressor of claim 2 wherein the comparator is configured to select the at least some residual subband signals in response to a harmonic relationship between a frequency of the first frequency interval and a subband frequency of the residual subband signals.

10. The audio echo suppressor of claim 1 wherein the first estimator comprises:
a first subband generator for generating a first residual subband signal for the first frequency interval from the residual signal;
a second subband generator for generating a plurality of first audio subband signals from the first audio signal;
the comparator for determining a similarity measure for at least some first audio subband signals not belonging to the first frequency interval, the similarity measure for a first audio subband signal being indicative of a similarity of the first audio subband signal and the first residual subband signal; and
a second estimator for determining the distortion measure for the first frequency interval from the similarity values.

11. The audio echo suppressor of claim 10 wherein the second estimator is configured to generate the distortion measure for the first residual subband signal based on a combination of similarity values for a plurality of the at least some first audio subband signals.

12. The audio echo suppressor of claim 1 wherein the echo reducer is configured to modify the first audio signal in response to the set of at least one distortion measure prior to rendering by the loudspeaker.

13. The audio echo suppressor of claim 12 wherein the echo reducer is configured to set a gain or a clipping level for the first audio signal in the first frequency interval in response to the distortion measure for the first frequency interval.

14. The audio echo suppressor of claim 1 wherein the echo reducer is configured to modify the residual signal in response to the set of at least one distortion measure.

15. A method of audio echo suppression comprising acts of:
receiving in a first receiver, a first audio signal for rendering by a loudspeaker;
receiving in a second receiver, a microphone signal;
generating by a linear echo-cancellation filter a first compensation signal from the first audio signal;
generating in a compensator, a residual signal by subtracting the first compensation signal from the microphone signal;
determining by a first adaptor, a set of filter parameters for the linear echo-cancellation filter in response to the residual signal;
generating by an first estimator, a set of at least one distortion measure providing indication of non-linear distortion which is caused by rendering of signal components in a first frequency interval of the first audio signal, said distortion measure being indicative of a contribution to the residual signal in at least one frequency interval that is outside the first frequency interval; and
echo suppressing by an echo reducer, in response to the set of at least one distortion measure,
wherein the act of generating the set of at least one distortion measure comprises acts of:
determining a similarity measure for the residual signal not belonging to the first frequency interval, the similarity measure for the residual signal being indicative of a similarity of the residual signal and the first audio signal; and
determining the distortion measure for the first frequency interval from the similarity values.

16. The method of claim 15, where the act of generating the set of at least one distortion measure further comprises acts of:
generating by a first subband generator a first subband signal for the first frequency interval from the first audio signal; and
generating by a second subband generator a plurality of residual subband signals from the residual signal,
wherein the act of determining the similarity measure is performed by a comparator configured to determine a further similarity measure for at least some residual subband signals not belonging to the first frequency interval, the further similarity measure for a residual subband signal being indicative of a similarity of the residual subband signal and the first subband signal.

* * * * *